Oct. 30, 1951

W. E. BRADLEY 2,572,907

SUPERREGENERATIVE RECEIVER

Filed April 6, 1946

INVENTOR.
WILLIAM E. BRADLEY
BY
AGENT

Patented Oct. 30, 1951

2,572,907

UNITED STATES PATENT OFFICE 2,572,907

SUPERREGENERATIVE RECEIVER

William E. Bradley, Wyndmoor, Pa., assignor, by mesne assignments, to Philco Corporation, Philadelphia, Pa., a corporation of Pennsylvania Application April 6, 1946, Serial No. 660,037

5 Claims. (Cl. 250—20)

This invention relates to improved quenching circuits for superregenerative oscillators employed in superregenerative receivers. In particular it relates to circuit arrangements for applying alternating waveforms adapted to produce periodic quenching and unquenching of a superregenerative oscillator without inducing any substantial shock excitation of the oscillator tank circuit. By shock excitation is meant that harmonics of the quench signal, in the neighborhood of the frequency to which the tank circuit is tuned, are introduced into the tank circuit and cause oscillations to build up independently of the desired oscillations resulting from the presence of a received signal. This tends greatly to reduce the signal-to-noise ratio of the receiver and is most undesirable.

The invention is particularly applicable in instances where rectangular pulse signals are used to control quenching, as in the radio ranging systems described in my copending application, Serial Number 651,398, filed March 1, 1946, which issued as Patent No. 2,536,346 January 2, 1950, where the likelihood of shock excitation of the tank circuit is increased by reason of the rapidity with which the oscillator is quenched and unquenched. However it is usable to advantage in any superregenerative receiver or oscillator.

The invention in its several forms is adapted to utilize either a single alternating signal to control quenching and unquenching or to be operated in push-pull using two such signals which are mutually inverse.

Figure 1:
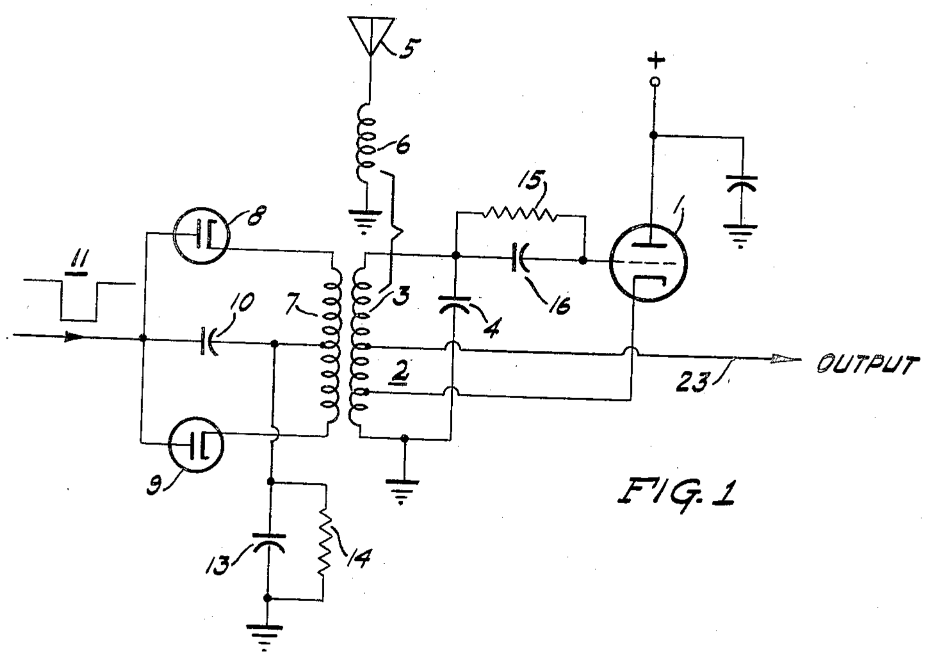
Figure 2:
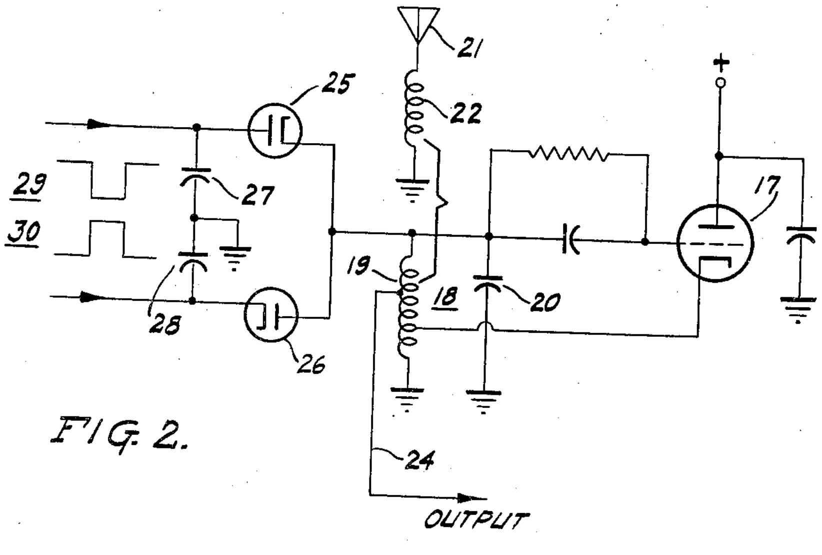

Features and advantages of the invention, in addition to those above referred to, will become apparent from a consideration of the following specification and the drawings, comprising Figures 1 and 2, which illustrate different embodiments of the invention applied to superregenerative receivers.

In the embodiment of Figure 1, the superregenerative receiver comprises a triode 1 and a resonant tank circuit 2, including inductor 3 and condenser 4. Tank circuit 2 may be tuned to any frequency suitable for superregenerative oscillation. A portion of inductor 3 is made common to both grid and plate circuits of triode 1 in order to provide the necessary mutual coupling required for oscillation. The grid of triode 1 may be appropriately biased through the action of grid leak 15 and condenser 16. Received signals intercepted by antenna 5 are supplied to tank circuit 2 through the medium of mutual coupling between inductors 3 and 6. Signal output from the tank circuit is derived through a connection 23 to a tap on inductor 3.

Also coupled to tank circuit 2 through inductor 7 is a damping circuit comprising serially and oppositely connected diodes 8 and 9. To both diodes is supplied, across condenser 10 connected between the plates of both and a center tap on inductor 7, the quench control signal which may comprise periodically recurring negative unquenching pulses corresponding to the one represented at 11. Diodes 8 and 9 are normally biased through the action of condenser 13 and resistor 14 to conduct and introduce damping into tank circuit 2. During the negative portions of the quench control signal they will be rendered nonconducting so as to remove the damping from tank circuit 2 and permit oscillations to build up therein. At the time of transition of diodes 8 and 9 from their nonconducting to their conducting state, the applied quench control signal will cause surge currents to flow from each end of damping winding 7 to its center and thence to ground. Hence no currents will be induced in tank circuit inductor 3 in response to these surge currents. However, electromotive forces at the oscillator frequency will be induced in winding 7. During the early stages of build-up of oscillations in the tank circuit, when the peak amplitude of these forces is small compared to the unquenching bias applied to diodes 8 and 9, both diodes may conduct continuously. However, at later stages in oscillation buildup, when these forces exceed the diode bias, induced currents will flow in the diodes during alternate half cycles at the oscillator frequency. For this reason the value of condenser 10 must be made sufficiently large to permit it to by-pass currents at the oscillator frequency. On the other hand it should not be so large as to prevent the application of a quenching signal of appreciable magnitude to diodes 8 and 9. If this condenser is not of the proper value, control of the oscillator may be lost and it will oscillate continuously regardless of the quenching signal applied.

In the embodiment of the invention shown in Figure 2, the basic superregenerative oscillator and associated connections may be essentially the same as in the embodiment of Figure 1 just described. It may comprise triode 17 cooperating with tank circuit 18 which includes inductor 19 and condenser 20. Received signals intercepted by antenna 21 are impressed on tank circuit 18 through the medium of inductor 22 coupled to tank circuit inductor 19. As in the previous instance, output from the oscillator may be derived through a connection 24 to a tap on inductor 19. In this arrangement the quenching circuit is adapted to be driven in push-pull and comprises diodes 25 and 26, the cathode and plate of which, respectively, are connected to the high potential side of the tank circuit. To the plate of diode 25 and the cathode of diode 26 are supplied mutually inverse quench control signals developed across condensers 27 and 28 respectively. These signals are preferably of substantially the same amplitude, and may comprise rectangular pulses of the form shown at 29 and 30. During the occurrence of a negative pulse on the plate of diode 25 and a positive pulse on the cathode of diode 26 both tubes will be cut off and no damping will be induced in tank circuit 18, so that oscillations will build up therein. However, in the intervals between unquenching pulses, when the plate of diode 25 is positive and the cathode of diode 26 is negative, both diodes will be rendered conductive and currents at the oscillator frequency will flow in either or both of them under the circumstances as set forth in the discussion of the embodiment of Figure 1. However, because of the fact that equal and opposite quench control signals are applied respectively to the plate of diode 25 and the cathode of diode 26, the high potential side of tank circuit 18, will experience no alternating potential variation corresponding to the quench control wave form, and hence, tank circuit 18 will be substantially free from shock excitation. As in the previously described embodiment condensers 27 and 28 should be large enough to by-pass signals at the oscillator frequency, but not so large as to prevent the application of quenching signals of suitable magnitude to the two diodes.

Thus it will be seen that by my invention I have provided circuits for controlling the quenching and unquenching of superregenerative oscillators, while substantially preventing the shock-excitation of the tank circuits thereof. Such operation is achieved in accordance with my invention, and in both of the embodiments thereof hereinbefore described, particularly by reason of the fact that the signal in response to which the quenching is controlled is not applied directly to the oscillatory circuits, but instead is applied to damping circuits coupled thereto and arranged so that they are effective to isolate the oscillatory circuits from the source of the quench-controlling signals. In this respect circuits according to my invention differ fundamentally from those of the prior art, in which quench-controlling signals are impressed directly upon portions of the oscillatory circuits of the superregenerator, and which therefore operate to produce therein shock-excited oscillations of substantial magnitude which are highly deleterious in their effect upon the operation of the circuits for their intended purposes.

For example only, the values of certain of the components used in the embodiments just described are given. In the embodiment of Figure 1, with the superregenerator oscillating at 60 megacycles per second and with unquenching at the rate of 80 kc./sec., diodes 8 and 9 may comprise the two sections of a type 6H6 duplex diode and condenser 10 may have a value of 25 $\mu\mu$ farads. In the embodiment of Figure 2 diodes 25 and 26 may comprise the two sections of a type 6AL5 tube and both condensers 27 and 28 may be of 25 $\mu\mu$ farad capacity.

Certain variations in the circuit arrangements, not here shown but such as will occur to those skilled in the art upon reading this specification, are regarded as being within the scope of my invention.

I claim:

1. In a superregenerative receiver, a vacuum tube and a resonant tank circuit cooperating to form an oscillator, means for applying to said oscillator a signal to be amplified therein, a closed circuit comprising a pair of unilateral conducting devices and an inductor, said unilateral conducting devices being connected in opposed relationship in said closed circuit and said inductor being coupled to said tank circuit whereby said closed circuit is effective to damp said tank circuit, a source of alternating control signal and means for applying said control signal between the junction of said unilateral conducting devices and a center tap on said inductor to render said devices intermittently conductive and thereby to control the damping of said tank circuit, and means for deriving output from said tank circuit.

2. In a superregenerative receiver, a vacuum tube and a resonant tank circuit cooperating to form an oscillator adapted to oscillate at a relatively high frequency, means for applying to said oscillator a signal to be amplified therein, a closed circuit comprising a pair of unilateral conducting devices and an inductor, said unilateral conducting devices being connected in opposed relationship in said closed circuit and said inductor being coupled to said tank circuit whereby said closed circuit is effective to damp said tank circuit, a source of alternating control signal of relatively lower frequency and means for applying said control signal between the junction of said unilateral conducting devices and a center tap on said inductor to render said devices intermittently conductive and thereby to control the damping of said tank circuit, a condenser connected between the junction of said unilateral conducting devices and said center tap, the capacity of said condenser being such as to by-pass currents at said oscillator frequency but to permit the application of said alternating control signal to said unilateral conducting devices in appreciable magnitude, and means for deriving output from said tank circuit.

3. In a superregenerative receiver, a vacuum tube oscillator having a resonant tank circuit and being so constructed and arranged as to generate high frequency oscillations, means for applying to said oscillator a signal to be amplified therein, a pair of unilaterally conductive devices having unlike terminals connected to a portion of said tank circuit of a given high frequency potential, connections from the other terminals of said devices to a portion of said tank circuit of different high frequency potential, said connections having a low impedance value for currents at the frequencies of said high frequency oscillations, a source of inverse alternating control signals of relatively lower frequency, means for applying said control signals in push-pull relation to said other terminals of said devices to render said devices intermittently conductive and thereby to control the damping of said tank circuit, and means for deriving output from said tank circuit.

4. In a superregenerative receiver, a vacuum tube oscillator having a resonant tank circuit and being so constructed and arranged as to generate high frequency oscillations, means for applying to said oscillator a signal to be amplified therein, a pair of damping circuits coupled to said tank circuit by means capable of transferring high frequency oscillations from said tank circuit to said damping circuits, each of said damping circuits comprising a closed circuit presenting relatively low impedance to the flow of currents therein at frequencies of said high frequency oscillations, a unilaterally conductive device connected in series in one of said closed circuits and poled so as to conduct only in response to portions of cycles of said high frequency oscillations of a given polarity, a unilaterally conductive device connected in series in the other of said closed circuits and poled so as to conduct only in response to portions of cycles of said high frequency oscillations of opposite polarity, means for applying alternating control signals of relatively lower frequency to said devices to render them simultaneously alternately conductive and non-conductive thereby to control the damping of said tank circuit, and means for deriving output from said tank circuit.

5. A superregenerative receiver according to claim 4 in which one of said damping circuits is coupled to said tank circuit by means of a portion of said tank circuit which is also included in said one damping circuit and in which the other of said damping circuits is coupled to said tank circuit by means of a portion of said tank circuit which is also included in said other damping circuit.

WILLIAM E. BRADLEY.

REFERENCES CITED

The following references are of record in the file of this patent:

UNITED STATES PATENTS

| Number | Name | Date |
|---|---|---|
| 2,230,108 | Gerhard | Jan. 28, 1941 |
| 2,301,160 | Finch | Nov. 3, 1942 |
| 2,350,552 | George | June 6, 1944 |
| 2,410,768 | Worcester | Nov. 5, 1946 |
| 2,412,710 | Bradley | Dec. 17, 1946 |